(12) United States Patent
Ouchi et al.

(10) Patent No.: US 10,164,287 B2
(45) Date of Patent: Dec. 25, 2018

(54) ALL-SOLID BATTERY AND MANUFACTURING METHOD THEREFOR

(71) Applicant: MURATA MANUFACTURING CO., LTD., Nagaokakyo-Shi, Kyoto Fu (JP)

(72) Inventors: Masutaka Ouchi, Nagaokakyo (JP); Makoto Yoshioka, Nagaokakyo (JP); Takeshi Hayashi, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 403 days.

(21) Appl. No.: 14/157,673

(22) Filed: Jan. 17, 2014

(65) Prior Publication Data

US 2014/0134483 A1 May 15, 2014

Related U.S. Application Data

(63) Continuation of application No. PCT/JP2012/067884, filed on Jul. 13, 2012.

(30) Foreign Application Priority Data

Jul. 20, 2011 (JP) ................................. 2011-158706

(51) Int. Cl.
*H01M 6/00* (2006.01)
*H01M 10/04* (2006.01)
(Continued)

(52) U.S. Cl.
CPC ........... *H01M 10/04* (2013.01); *H01M 4/043* (2013.01); *H01M 4/0471* (2013.01);
(Continued)

(58) Field of Classification Search
CPC ............... H01M 10/04; H01M 10/052; H01M 10/0562; H01M 10/0585; H01M 4/043;
(Continued)

(56) References Cited

U.S. PATENT DOCUMENTS 5,229,213 A * 7/1993 Horiuchi ............. H01L 21/4867
257/E23.009
6,001,761 A * 12/1999 Hata ..................... C04B 35/486
204/295

(Continued)

FOREIGN PATENT DOCUMENTS

JP 7-97270 * 4/1995 .......... C04B 35/626
JP 2009-080970 A 4/2009
(Continued)

OTHER PUBLICATIONS

PCT/JP2012/067884 ISR dated Oct. 9, 2012.
PCT/JP2012/067884 Written Opinion dated Oct. 9, 2012.

*Primary Examiner* — Raymond Alejandro
(74) *Attorney, Agent, or Firm* — Arent Fox LLP

(57) ABSTRACT

A method for manufacturing an all-solid battery that includes preparing a first green sheet as a green sheet for at least any one of a positive electrode layer and a negative electrode layer and a second green sheet as a green sheet for a solid electrolyte layer, stacking the first green sheet and the second green sheet to form a stacked body, and firing the stacked body with a setter placed in contact with at least one surface of the stacked body. The setter in contact with the at least one surface of the stacked body is 0.11 μmRa or more and 50.13 μmRa or less in surface roughness.

15 Claims, 2 Drawing Sheets

(51) Int. Cl.
*H01M 10/0562* (2010.01)
*H01M 10/0585* (2010.01)
*H01M 4/04* (2006.01)
*H01M 6/18* (2006.01)
*H01M 6/40* (2006.01)
*H01M 10/052* (2010.01)
*H01M 4/02* (2006.01)

(52) U.S. Cl.
CPC ........... *H01M 6/185* (2013.01); *H01M 6/188* (2013.01); *H01M 6/40* (2013.01); *H01M 10/0562* (2013.01); *H01M 10/0585* (2013.01); *H01M 10/052* (2013.01); *H01M 2004/021* (2013.01); *H01M 2300/0068* (2013.01); *Y02E 60/122* (2013.01); *Y02P 70/54* (2015.11); *Y10T 29/49108* (2015.01)

(58) Field of Classification Search
CPC .... H01M 4/0471; H01M 6/185; H01M 6/188; H01M 6/40; H01M 2004/021; H01M 2300/0068; Y02E 60/122
See application file for complete search history.

(56) References Cited

U.S. PATENT DOCUMENTS

| | | |
|---|---|---|
| 2009/0081555 A1 | 3/2009 | Teramoto |
| 2009/0197172 A1* | 8/2009 | Inda ............... H01M 4/0471 429/209 |
| 2011/0081580 A1 | 4/2011 | Stadler |

FOREIGN PATENT DOCUMENTS

| | | |
|---|---|---|
| JP | 2009-206087 A | 9/2009 |
| JP | 2011-046127 A | 3/2011 |
| JP | 2011-096630 A | 5/2011 |

\* cited by examiner

ALL-SOLID BATTERY AND MANUFACTURING METHOD THEREFOR

CROSS REFERENCE TO RELATED APPLICATIONS

The present application is a continuation of International application No. PCT/JP2012/067884, filed Jul. 13, 2012, which claims priority to Japanese Patent Application No. 2011-158706, filed Jul. 20, 2011, the entire contents of each of which are incorporated herein by reference.

FIELD OF THE INVENTION

The present invention relates to an all-solid battery and a method for manufacturing the all-solid battery.

BACKGROUND OF THE INVENTION

In recent years, the demand has been substantially expanded for batteries as power sources for portable electronic devices such as cellular phones and portable personal computers. In the batteries for use in such applications, electrolytes (electrolytic solutions) such as organic solvents have been conventionally used as media for moving ions.

However, the batteries configured above are at risk of causing the electrolytic solutions to leak out. In addition, the organic solvents or the like for use in the electrolytic solutions are flammable materials. For this reason, there has been a need to further increase the safety of the batteries.

Therefore, as one of countermeasures for increasing the safety of the batteries, it has been proposed that solid electrolytes are used as the electrolytes, in place of electrolytic solutions. Furthermore, the development of all-solid batteries which use solid electrolytes as the electrolytes and have other constituent elements also composed of solids has been advanced.

For example, Japanese Patent Application Laid-Open No. 2009-206087 (hereinafter, referred to as Patent Document 1) discloses a method for manufacturing an all-solid battery, where a stacked body of green sheets constituting the all-solid battery is subjected to firing with the stacked body sandwiched between setters.

In addition, for example, Japanese Patent Application Laid-Open No. 2009-80970 (hereinafter, referred to as Patent Document 2) discloses a method for producing a solid electrolyte, where a green sheet constituting the solid electrolyte is subjected to firing with the green sheet covered with a setter of 10 volume % in voidage.

Patent Document 1: Japanese Patent Application Laid-Open No. 2009-206087
Patent Document 2: Japanese Patent Application Laid-Open No. 2009-80970

SUMMARY OF THE INVENTION

As a result of various studies carried out by the inventors on methods for manufacturing an all-solid battery or a solid electrolyte as described in Patent Documents 1 and 2, it was found that in the case of manufacturing an all-solid battery by stacking green sheets to form a stacked body, and firing the stacked body with the stacked body sandwiched between setters, gas produced by the decomposition or vaporization of a resin is confined within the stacked body by the setters in a step of removing by burning the resin contained in the green sheets (degreasing step). As a result, it was found that there is a possibility that a residue of the resin will remain as a carbon residue in a carbonized state within the stacked body, and when this carbon residue is present within the solid electrolyte layer, internal short circuit of the all-solid battery will be caused. The present invention has been achieved on the basis of the finding mentioned above.

Therefore, an object of the present invention is to provide a method for manufacturing an all-solid battery, which is able to suppress internal short circuit of the all-solid battery, and an all-solid battery manufactured by the method.

As a result of various studies made by the inventors in order to solve the problem mentioned above, it has been found that in a step of firing a stacked body of green sheets with the stacked body sandwiched between setters or partially covered with a setter, controlling the condition of the contact interface between the setter and the stacked body can suppress the generation of carbon residue, and suppress internal short circuit of the all-solid battery. On the basis of this finding of the inventors, the present invention has the following features.

A method for manufacturing an all-solid battery in accordance with the present invention includes the following steps.

(A) Green sheet preparation step of preparing a first green sheet as a green sheet for at least any one of a positive electrode layer and a negative electrode layer, and a second green sheet as a green sheet for a solid electrolyte layer.

(B) Stacked body formation step of stacking the first green sheet and the second green sheet to form a stacked body.

(C) Firing step of firing the stacked body with a setter placed in contact with at least one surface of the stacked body.

In the firing step, the setter in contact with at least one surface of the stacked body is 0.11 µmRa or more and 50.13 µmRa or less in surface roughness.

In the firing step, the setter in contact with at least one surface of the stacked body is preferably 1.04 µmRa or more and 10.01 µmRa or less in surface roughness.

In the firing step, pressure is preferably applied to the stacked body through the setter.

In addition, the firing step includes: a first firing step of firing the stacked body at a first firing temperature; and a second firing step of firing the stacked body at a second firing temperature after the first firing step, and the second firing temperature is preferably higher than the first firing temperature.

In the method for manufacturing an all-solid battery according to the present invention, a material for at least one selected from the group consisting of the positive electrode layer, the solid electrolyte layer, and the negative electrode layer preferably contains a solid electrolyte composed of a lithium-containing phosphate compound which has a NASICON-type structure.

In the method for manufacturing an all-solid battery according to the present invention, a material for at least one selected from the group consisting of the positive electrode layer and the negative electrode layer preferably contains an electrode active material composed of a lithium-containing phosphate compound.

An all-solid battery in accordance with the present invention is manufactured by the manufacturing method including the features mentioned above.

The method for manufacturing an all-solid battery according to the present invention can suppress internal short circuit of the all-solid battery by limiting the surface roughness of at least one surface of the stacked body in contact with the setter within a predetermined range of values.

DETAILED DESCRIPTION OF THE INVENTION

Figure 1:
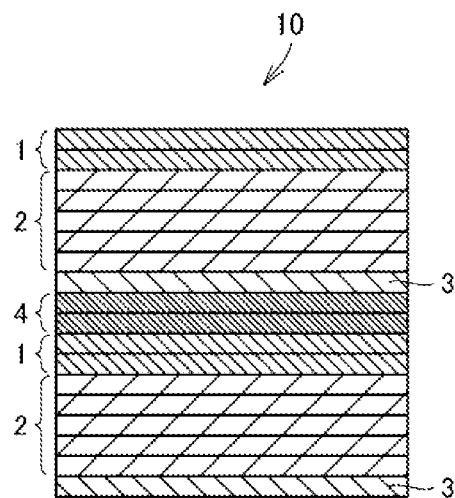
FIG. 1 is a cross-sectional view schematically illustrating a cross-section structure of an all-solid battery as one embodiment through the application of a manufacturing method according to the present invention.

As shown in FIG. 1, for a stacked body 10 of an all-solid battery as one embodiment through the application of a manufacturing method according to the present invention, more than one, for example, two electrical cells each composed of a positive electrode layer 1, a solid electrolyte layer 2, and a negative electrode layer 3 are connected in series with a current collector layer 4 interposed therebetween. The current collector layer 4 placed within the stacked body 10 of the all-solid battery is provided between the positive electrode layer 1 and the negative electrode layer 3.

It is to be noted that each of the positive electrode layer 1 and the negative electrode layer 3 contains a solid electrolyte and an electrode active material, whereas the solid electrolyte layer 2 contains a solid electrolyte. Each of the positive electrode layer 1 and the negative electrode layer 3 may contain carbon, metals, etc. as an electron conducting material.

In order to manufacture the stacked body for at least one electrical cell in the stacked body 10 of the all-solid battery configured as described above, according to the present invention, a first green sheet as a green sheet for at least any one of the positive electrode layer 1 and negative electrode layer 3, and a second green sheet as a green sheet for the solid electrolyte layer 2 are first prepared (green sheet preparation step). Thereafter, the first green sheet and the second green sheet are stacked to form the stacked body (stacked body formation step). Then, the stacked body is subjected to firing with a setter placed in contact with at least one surface of the stacked body (firing step). In this firing step, the setter in contact with at least one surface of the stacked body is 0.11 μmRa or more and 50.13 μmRa or less in surface roughness.

It is to be noted that the stacked body may be subjected to firing with the stacked body sandwiched between setters by placing the setters in contact with both surfaces of the stacked body in the firing step. Further, in order to manufacture the stacked body 10 of the all-solid battery shown in FIG. 1, respective green sheets for the positive electrode layer 1, the solid electrolyte layer 2, the negative electrode layer 3, and the current collector layer 4 are prepared and stacked in the order of the positive electrode layer 1, the solid electrolyte layer 2, the negative electrode layer 3, the current collector layer 4, the positive electrode layer 1, the solid electrolyte layer 2, and the negative electrode layer 3 to form the stacked body 10, and the stacked body 10 is subjected to firing with a setter placed in contact with at least one surface of the stacked body 10.

When the stacked body is subjected to firing while the setter of 0.11 μm or more and 50.13 μmRa or less in surface roughness is placed in contact with one or both surfaces of the stacked body, the resin which acts as a binder can be efficiently removed, and the generation of carbon residue can be suppressed. As a result, internal short circuit of the all-solid battery can be suppressed.

The advantageous effect is estimated to be due to the fact that the use of the setter of 0.11 μm or more and 50.13 μmRa or less in surface roughness reduces the substantial area of contact between the setter and the stacked body, resulting in making the gas produced by the decomposition or vaporization of the resin more likely to be discharged from the contact interface at which the setter and the stacked body are adjacent to each other.

When the setter is less than 0.11 μmRa in surface roughness, the area of contact between the setter and the stacked body is excessively large, and there is thus a possibility of making it impossible to adequately remove the carbon residue. When the setter is greater than 50.13 μmRa in surface roughness, there is a possibility that surface asperity of the setter will damage the surface of the stacked body. Moreover, there is a possibility that a surface region of the stacked body may dig into the concave portions at the surface of the setter to firmly fix the setter and the stacked body after the firing step.

In order to efficiently remove the carbon residue in a short period of time, and achieve a stacked body with little damage, the setter is preferably 1.04 μmRa or more and 10.01 μmRa or less in surface roughness.

It is to be noted that as the surface roughness, the arithmetic mean roughness is used which is obtained by providing the x axis along the surface of the setter, extracting only a reference length L in the x-axis direction from a roughness curve expressing the magnitude of asperity at a coordinate x in terms of f(x), and combining the absolute values of deviations from the average line to the measurement curve in the extracted portion. It is to be noted that the arithmetic mean roughness can be calculated with the use of an optical measuring device (Model Number: OLS4000) from Olympus Corporation, in accordance with JIS B0601-2001.

In the stacked body formation step, green sheets for the positive electrode layer 1, the solid electrolyte layer 2, and the negative electrode layer 3 may be stacked to form a stacked body which has an electrical cell structure, or in the stacked body formation step, more than one stacked body which has the electrical cell structure may be stacked with a green sheet for a current collector interposed therebetween to form a stacked body which has a multi-cell structure. In this case, more than one stacked body which has the electrical cell structure may be stacked electrically in series or in parallel.

In the firing step, the stacked body is preferably subjected to firing while pressure is applied to the stacked body through the setter. When the stacked body is subjected to firing while pressure is applied, the positive electrode layer 1 or negative electrode layer 3 and the solid electrolyte layer 2 are more likely to be joined by sintering without any space therebetween. As a result, the internal resistance of the all-solid battery can be reduced to achieve a high capacity.

In addition, the firing step includes: a first firing step of firing the stacked body at a first firing temperature; and a second firing step of firing the stacked body at a second firing temperature after the first firing step, and the second firing temperature is preferably higher than the first firing temperature. In this case, when the stacked body is kept at a lower temperature in the first firing step, a degreasing treatment can be carried out, and the resin which acts as a binder can be removed more efficiently. Thereafter, when the stacked body is kept at a higher temperature in the second firing step, a stacked body for an all-solid battery can be achieved in which generation of carbon residue is suppressed. Thus, internal short circuit of the all-solid battery can be suppressed more effectively.

While the porosity of the setter for use in the firing step is not particularly limited as long as the setter is a porous body including pores (voids) therein, a setter is preferably used which is 10 volume % or more and 50 volume % or less in porosity.

While the material of the setter is not particularly limited as long as the material has a high melting point and is less likely to be joined with the stacked body by reaction or sintering, the material preferably contains one or more ceramics selected from, for example, silicon carbide (SiC), silicon nitride ($Si_3N_4$), boron nitride (BN), aluminum nitride (AlN), beryllium oxide (BeO), molybdenum disilicide ($MoSi_2$), titanium nitride (TiN), and zirconium boride ($ZrB_2$).

The setter preferably has a high thermal conductivity. The high thermal conductivity of the setter makes the stacked body adjacent to the setter likely to have a homogeneous temperature distribution in firing the stacked body. Specifically, a setter is preferably used which has a thermal conductivity of 5 W/m·K or more.

The setter preferably has a high bending strength. The high bending strength of the setter can prevent the setter from being broken or deformed during the firing. Specifically, a setter is preferably used which has a bending strength of 20 MPa or more.

While the method for forming the stacked body in the stacked body formation step is not particularly limited, the stacked body can be formed by sequentially stacking green sheets one by one, and applying pressure to the stacked green sheets. While the pressure applied to the green sheets is not particularly limited, the stacked body which is dense and less likely to be peeled can be formed by applying a pressure of 500 kg/cm² or more and 5000 kg/cm² or less to the green sheets.

The green sheets may be stacked by heating while applying pressure to the green sheets. While the temperature for heating is not particularly limited, the green sheets are preferably stacked while softening the resin at a temperature of 20° C. or higher and 100° C. or lower.

While the method for forming the green sheets is not particularly limited, a die coater, a comma coater, screen printing, etc. can be used.

Slurry for forming the green sheets can be prepared by wet mixing, an organic vehicle with a polymer material dissolved in a solvent, with a positive electrode active material, a negative electrode active material, a solid electrolyte, or a current collector material. In the wet mixing, media can be used, and specifically, a ball mill method, a visco mill method, etc. can be used. On the other hand, wet mixing methods may be used which use no media, and a sand mill method, a high-pressure homogenizer method, a kneader dispersion method, etc. can be used.

The slurry may contain a plasticizer. While the type of the plasticizer is not particularly limited, phthalates and the like may be used such as dioctyl phthalate and diisononyl phthalate.

While the method for stacking the green sheets is not particularly limited, hot isostatic pressing (HIP), cold isostatic pressing (CIP), water isostatic pressing (WIP), etc. can be used to stack the green sheets.

While the atmosphere is not particularly limited in the firing step, the firing step is preferably carried out under the condition that the transition metal contained in the electrode active material undergoes no change in valence.

It is to be noted that while the type of the electrode active material is not limited which is contained in the positive electrode layer 1 or negative electrode layer 3 of the stacked body 10 of the all-solid battery through the application of the manufacturing method according to the present invention, lithium-containing phosphate compounds which have a NASICON-type structure such as $Li_3V_2(PO_4)_3$, lithium-containing phosphate compounds which have an olivine-type structure such as $LiFePO_4$ and $LiMnPO_4$, layered compounds such as $LiCoO_2$ and $LiCo_{1/3}Ni_{1/3}Mn_{1/3}O_2$, and lithium-containing compounds which have a spinel-type structure such as $LiMn_2O_4$ and $LiNi_{0.5}Mn_{1.5}O_4$ can be used as the positive electrode active material.

Compounds which have a composition represented by MOx (M is at least one or more elements selected from the group consisting of Ti, Si, Sn, Cr, Fe, Nb, and Mo, and x is a numerical value in the range of $0.9 \leq x \leq 2.0$) can be used as the negative electrode active material. For example, a mixture may be used which is obtained by mixing two or more active materials containing different elements M, which have compositions represented by MOx, such as $TiO_2$ and $SiO_2$. In addition, graphite-lithium compounds, lithium alloys such as Li—Al, oxides such as $Li_3V_2(PO_4)_3$, $Li_3Fe_2(PO_4)_3$, and $Li_4Ti_5O_{12}$, etc. can be used as the negative electrode active material.

In addition, while the type of the solid electrolyte is not limited which is contained in the positive electrode layer 1, negative electrode layer 3, or solid electrolyte layer 2 of the stacked body 10 of the all-solid battery through the application of the manufacturing method according to the present invention, lithium-containing phosphate compounds which have a NASICON-type structure can be used as the solid electrolyte. The lithium-containing phosphate compounds which have a NASICON-type structure are represented by the chemical formula $Li_xM_y(PO_4)_3$ (in the chemical formula, x and y are respectively numerical values in the ranges of $1 \leq x \leq 2$ and $1 \leq y \leq 2$, and M represents one or more elements selected from the group consisting of Ti, Ge, Al, Ga, and Zr). In this case, P may be partially substituted with B, Si, or the like in the above chemical formula. For example, a mixture may be used which is obtained by mixing two or more lithium-containing phosphate compounds of different compositions which have a NASICON-type structure, such as $Li_{1.5}Al_{0.5}Ge_{1.5}(PO_4)_3$ and $Li_{1.2}Al_{0.2}Ti_{1.8}(PO_4)_3$.

In addition, compounds including a crystalline phase of a lithium-containing phosphate compound which has a NASICON-type structure, or glass from which crystalline phase of a lithium-containing phosphate compound which has a NASICON-type structure is deposited through a heat treatment may be used as the lithium-containing phosphate compounds which have a NASICON-type structure, for use in the solid electrolyte.

Further, it is possible to use, as the material for use in the solid electrolyte, materials which have ion conductivity and negligible small electron conductivity, besides the lithium-containing phosphate compounds which have a NASICON-type structure. Such materials can include, for example, lithium halide, lithium nitride, lithium oxoate, and derivatives thereof. In addition, the materials can include Li—P—O compounds such as lithium phosphate ($Li_3PO_4$), LIPON ($LiPO_{4-x}N_x$) with nitrogen introduced into lithium phosphate, Li—Si—O compounds such as $Li_4SiO_4$, Li—P—Si—O compounds, Li—V—Si—O compounds, compounds which have perovskite-type structures such as $La_{0.51}Li_{0.35}TiO_{2.94}$, $La_{0.55}Li_{0.35}TiO_3$, and $Li_{3x}La_{2/3-x}TiO_3$, and compounds which have a garnet-type structure containing Li, La, and Zr.

At least one material for the positive electrode layer 1, solid electrolyte layer 2, or negative electrode layer 3 of the stacked body 10 of the all-solid battery through the application of the manufacturing method according to the present invention preferably contains a solid electrolyte composed of a lithium-containing phosphate compound which has a NASICON-type structure. In this case, high ion conductivity can be achieved which is essential for battery operation of the all-solid battery. In addition, the use of, as the solid electrolyte, glass or glass ceramic which has the composition of a lithium-containing phosphate compound of NASICON-type structure can easily achieve a denser sintered body through the viscous flow of the glass phase in the firing step, and it is thus particularly preferable to prepare starting raw materials for the solid electrolyte in the form of glass or glass ceramic.

In addition, at least one material for the positive electrode layer 1 or negative electrode layer 3 of the stacked body 10 of the all-solid battery through the application of the manufacturing method according to the present invention preferably contains an electrode active material composed of a lithium-containing phosphate compound. In this case, the phase change of the electrode active material or the reaction of the electrode active material with the solid electrolyte in the firing step can be easily suppressed with high temperature stability of the phosphate skeleton, and the capacity of the all-solid battery can be thus increased. In addition, when the electrode active material composed of a lithium-containing phosphate compound is used in combination with the solid electrolyte composed of a lithium-containing phosphate compound of NASICON-type structure, the reaction between the electrode active material and the solid electrolyte can be suppressed in the firing step, and favorable contact between the both can be achieved. Thus, it is particularly preferable to use the materials for the electrode active material and solid electrolyte in combination as described above.

Furthermore, the current collector layer 4 of the stacked body 10 of the all-solid battery through the application of the manufacturing method according to the present invention contains an electron-conducting material. The electron-conducting material preferably contains at least one selected from the group consisting of conductive oxides, metals, and carbon materials.

Next, examples of the present invention will be described specifically. It is to be noted that the following examples will be given by way of example, and the present invention is not to be considered limited to the following examples.

EXAMPLES

All-solid batteries prepared in accordance with the manufacturing method according to the present invention will be described below.

Preparation of Setter

First, setters with the surface roughness as shown in Table 1 below were prepared in accordance with the following steps.

Fibers of alumina ($Al_2O_3$) and a ceramic powder including particles of silicon carbide (SiC) as a main material were subjected to wet mixing in a ball mill to prepare slurry. The obtained slurry was subjected to a dehydration treatment, and calcination at a temperature of 1100° C. in an electric furnace. To 100 parts by weight of the calcined powder, 5 parts by weight of polyvinyl alcohol resin was added, and the powder and the resin were subjected to wet mixing in a ball mill to prepare slurry. This slurry was granulated by drying with a spray drier. To the granulated powder obtained, a pressure of 1 ton/$cm^2$ was applied by press forming to form the powder into the form of a thin sheet. The obtained compact was 50 mm×50 m×2.0 mm thick in dimensions. This compact was subjected to firing at a temperature of 1200° C. In this way, the setter was prepared.

The surface roughness of the obtained setter was adjusted as follows.

Lapping was carried out by introducing diamond abrasive grains and a polishing solution between a lap surface plate and the setter, and rotating the lap surface plate and the setter while rubbing against each other. This lapping removed large undulation of the setter, and adjusted the surface roughness to a desired value. In this case, the surface roughness of the setter was adjusted to the desired values shown in Table 1 below by adjusting the lapping time with the rotation speed of the lap surface plate from 30 to 200 rpm.

Preparation of Materials

Next, in order to prepare an all-solid battery, the following materials were prepared as starting raw materials for the solid electrolyte layer, positive electrode layer, negative electrode layer, and current collector layer.

Prepared were a glass powder with a composition of $Li_{1.5}Al_{0.5}Ge_{1.5}(PO_4)_3$ as a solid electrolyte material, a powder including a crystalline phase of NASICON-type structure with a composition of $Li_3V_2(PO_4)_3$ as a positive electrode active material, a titanium dioxide powder of anatase-type crystal structure as a negative electrode active material, a carbon powder as an electron-conducting material, and a glass ceramic powder with a composition of $Li_{1.0}Ge_{2.0}(PO_4)_3$ as a sintering material.

The materials mentioned above were used to prepare each slurry by the following method.

Preparation of Slurry

The following main material, acrylic resin, and alcohol were weighed in proportions by mass at 100:15:140. Then, the acrylic resin was dissolved in alcohol, and then enclosed in a container along with the main material and media, and after rotating the container, the media were taken out of the container to prepare each slurry.

A solid electrolyte material for solid electrolyte slurry, a powder obtained by mixing a positive electrode active material, an electron-conducting material, and a solid electrolyte material in proportions by mass at 45:15:40 for positive electrode slurry, a powder obtained by mixing a negative electrode active material, an electron-conducting material, and a solid electrolyte material in proportions by mass at 45:15:40 for negative electrode slurry, or a powder by mixing an electron-conducting material and a sintering material in proportions by mass at 10:90 for current collector slurry was used as the main material.

Each slurry obtained was used to prepare each green sheet by the following method.

Green Sheet Preparation Step

Each slurry was applied onto a polyethylene terephthalate (PET) film by use of a doctor blade method, dried on a hot plate heated to a temperature of 40° C., formed into the shape of a sheet of 10 µm in thickness, and cut into a size of 35 mm×35 mm to prepare a sheet.

The respective green sheets obtained were used to form a stacked body by the following method.

Stacked Body Formation Step

Thermocompression bonding was sequentially carried out by sandwiching the green sheets between two stainless-steel flat plates, every time each of the green sheets peeled from the PET film was stacked. The thermocompression bonding was carried out by heating the stainless-steel flat plates to a temperature of 60° C., and applying a pressure of 1000 kg/cm². Thereafter, the stacked body of the green sheets subjected to thermocompression bonding were enclosed in a polyethylene film container in vacuum, and the polyethylene film container was immersed in water to apply pressure to the water. A pressure of 200 MPa was applied to the water by isostatic pressing. In this way, the stacked body 10 was formed.

It is to be noted that the stacked body 10 is structured with two electrical cells stacked to be electrically connected in series as shown in FIG. 1, where the two electrical cells are connected in series through the current collector layer 4 composed of two current collector green sheets. It is to be noted each electrical cell is composed of the positive electrode layer 1 of two positive electrode green sheets, the solid electrolyte layer 2 of five solid electrolyte green sheets, and the negative electrode layer 3 of one negative electrode sheet.

Cutting of Stacked Body

The stacked body 10 of 35 mm×35 mm in planar size was cut into a size of 10 mm×10 mm to prepare nine stacked bodies 10.

In the following steps, all of the nine stacked bodies of 10 mm×10 mm in planar size, which were cut out from one stacked body of 35 mm×35 mm in planar size, were subjected to firing and evaluated under the same condition by the following methods.

Firing Step

With the use of two setters with the varying surface roughness as shown in Table 1, the stacked body 10 was sandwiched between the two setters, and subjected to firing with a pressure of 10 kg/cm² applied to the setters. The firing step was carried out in the following two steps.

First firing step (degreasing step): in an atmosphere with air flowing, the temperature was gradually heated up from room temperature to a temperature of 400° C., kept at the temperature of 400° C. for a predetermined period of time as shown in Table 1, and then slowly cooled down to room temperature.

Second firing step: after the first firing step, in an atmosphere with nitrogen flowing, the temperature was gradually heated up from room temperature to a temperature of 700° C., kept at the temperature of 700° C. for 10 hours, and then slowly cooled down to room temperature.

Thereafter, the stacked body was removed from the setters.

The stacked body 10 of the all-solid battery prepared in this way was evaluated in the following way.

Evaluation 1

A side surface of the fired stacked body 10 was observed with an optical microscope (at 600-fold magnification) to observe the color of the solid electrolyte layer 2.

Evaluation 2

A positive electrode terminal and a negative electrode terminal were formed in such a way that a silver (Ag) paste was applied onto both surfaces of the fired stacked body 10, and dried while copper (Cu) lead terminals were buried into the metal paste.

The stacked body 10 of the all-solid battery with the positive and negative electrode terminals attached thereto was charged up to a voltage of 6 V at a current of 5 µA in an argon gas atmosphere, and kept for 10 hours at the voltage of 6 V. Then, the stacked body was left until the rate of decrease in battery voltage was decreased down to 0.1 mV/s (charging stopped). Thereafter, the stacked body was discharged down to a voltage of 0 V at a current of 5 µA.

Figure 2:
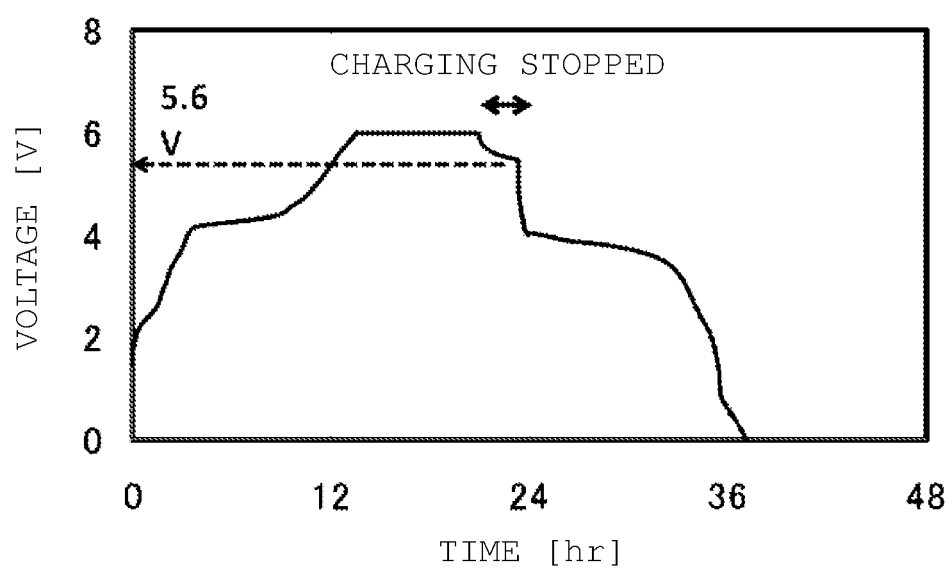
FIG. 2 is a diagram showing a charge-discharge curve for an all-solid battery prepared according to an example of the present invention.

FIG. 2 shows, as an example, a charge-discharge curve (second cycle) of the stacked body 10 of the all-solid battery subjected to the degreasing step by keeping at a temperature of 400° C. for 30 minutes in an atmosphere with air flowing, with the use of the setter of 4.95 µmRa in surface roughness.

From FIG. 2, it is understood that the battery voltage is about 5.6 V after stopping the charging. The value of the battery voltage is in close agreement with the battery voltage estimated from the positive electrode active material and the negative electrode active material. Furthermore, it is understood that the shape of the charge-discharge curve is also not particularly problematic, which shows favorable charging and discharging. From the foregoing, it is determined that the stacked body 10 of the all-solid battery in this example is favorably charged and discharged as an all-solid battery, without causing internal short circuit.

As for the determination of the presence or absence of internal short circuit, it was determined that there was internal short circuit when the following four conditions were all met on the basis of the charge-discharge curve in FIG. 2.

(i) In the case where the charging time (the time until the battery voltage reaches 6 V) is twice or more times as long as that in FIG. 2

(ii) In the case where the battery voltage is decreased down to 5 V or lower during stopping the charging (iii) In the case where the discharging time is less than half that in FIG. 2

(iv) In the case where the color of the solid electrolyte layer 2 is black in Evaluation 1 described above Evaluation Result A Table 1 shows, as the result of the evaluation mentioned above, the number of stacked bodies in which internal short circuit was found, among the nine stacked bodies 10 subjected to firing under the same condition on the surface roughness of the setter used and the holding time in the degreasing step.

TABLE 1

| Setter Surface Roughness | Degreasing Step (Air Atmosphere) Holding Time [min] | | | | |
|---|---|---|---|---|---|
| [μ mRa] | 15 | 30 | 60 | 90 | 120 |
| 0.04 | 9 | 9 | 9 | 8 | 9 |
| 0.11 | 0 | 0 | 0 | 0 | 0 |
| 1.04 | 0 | 0 | 0 | 0 | 0 |
| 4.95 | 0 | 0 | 0 | 0 | 0 |
| 10.01 | 0 | 0 | 0 | 0 | 0 |
| 50.13 | 0 | 0 | 0 | 0 | 0 |
| 80.59 | — | — | — | — | — |

From Table 1, it is understood that internal short circuit was found in substantially all of the all-solid batteries prepared with the use of the setter of 0.04 μmRa in surface roughness, regardless of the holding time in the degreasing step. In addition, it is understood that internal short circuit was not found in any of the all-solid batteries subjected to firing with the use of the setter of 0.11 μmRa or more in surface roughness, regardless of the holding time in the degreasing step. From the foregoing, it was confirmed that internal short circuit of the all-solid battery can be suppressed by using the setter of 0.11 μmRa or more in surface roughness.

In the case of the stacked body 10 subjected to firing with the use of the setter of 50.13 μmRa in surface roughness, the surface of the stacked body 10 had asperity caused by the surface roughness of the setter, regardless of the holding time in the degreasing step. In addition, in the case of the stacked body 10 subjected to firing with the use of the setter of 80.59 μmRa in surface roughness, as the holding time in the degreasing step was longer, the setter and the stacked body were strongly fixed to each other, and the surface of the stacked body was partially fallen away in the process of removing the setter. It is to be noted that in the case of the stacked body 10 of the all-solid battery subjected to firing with the use of the setter of 80.59 μmRa in surface roughness, the stacked body was considered to be broken, and not subjected to Evaluation 2.

Figure 3:
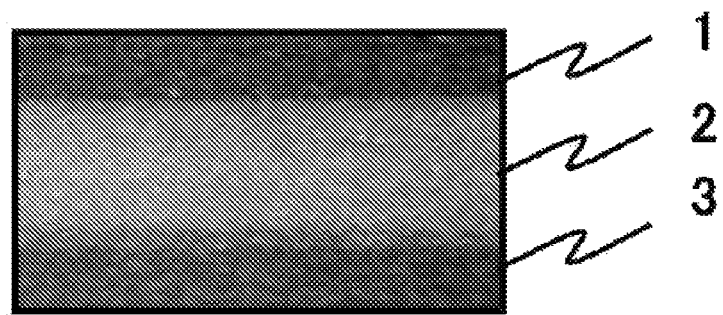
FIG. 3 is an optical micrograph showing a side surface of a stacked body of an all-solid battery prepared as a comparative example of the present invention.
Figure 4:
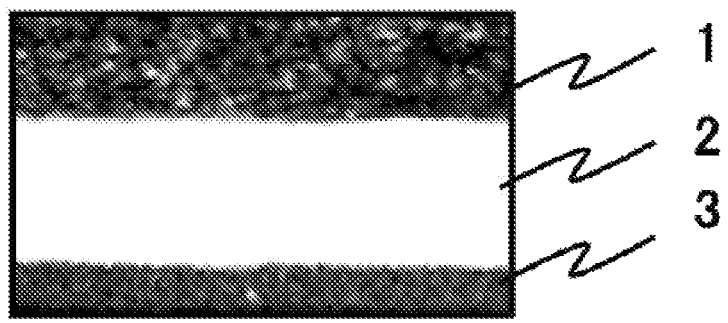
FIG. 4 is an optical micrograph showing a side surface of a stacked body of an all-solid battery prepared as an example according to the present invention.

As examples of Evaluation 1, FIGS. 3 and 4 show optical micrographs (near the solid electrolyte layers 2) of side surfaces of the stacked bodies 10 subjected to firing with the use of the setters of 0.04 μmRa and 0.11 μmRa in surface roughness, respectively, with the holding time of 30 minutes in the degreasing step.

As compared with the stacked body (FIG. 4) subjected to firing with the use of the setter of 0.11 μmRa in surface roughness, the solid electrolyte layer 2 of the stacked body (FIG. 3) subjected to firing with the use of the setter of 0.04 μmRa in surface roughness was obviously black, which suggested that there was carbon residue within the solid electrolyte layer 2. It is to be noted that, although not shown, the black solid electrolyte layer 2 as in FIG. 3 was observed in all of the stacked bodies subjected to firing with the use of the setter of 0.04 μmRa in surface roughness, regardless of the presence or absence of internal short circuit.

Next, with the use of the setters of 0.11 μmRa, 1.04 μmRa, and 4.95 μmRa in surface roughness, with which any internal short circuit was found in the evaluation results shown in Table 1, all of the nine stacked bodies were subjected to a firing step and evaluated under the same condition by the following methods.

With the use of two setters with varying surface roughness as shown in Table 2 below, the stacked body 10 was sandwiched between the two setters, and subjected to firing with a pressure of 10 kg/cm² applied to the setters. The firing step was carried out in the following two steps.

First firing step (degreasing step): in an atmosphere with nitrogen flowing, the temperature was gradually heated up from room temperature to a temperature of 400° C., kept at the temperature of 400° C. for a predetermined period of time as shown in Table 1, and then slowly cooled down to room temperature.

Second firing step: after the first firing step, in an atmosphere with nitrogen flowing, the temperature was gradually heated up from room temperature to a temperature of 700° C., kept at the temperature of 700° C. for 10 hours, and then slowly cooled down to room temperature.

Thereafter, the stacked body was removed from the setters.

The stacked body 10 of the all-solid battery prepared in this way was evaluated in accordance with Evaluation 2.

Evaluation Result B

Table 2 shows, as the result of the evaluation mentioned above, the number of stacked bodies in which internal short circuit was found, among the nine stacked bodies 10 subjected to firing under the same condition on the surface roughness of the setter used and the holding time in the degreasing step.

TABLE 2

| Setter Surface Roughness | Degreasing Step (Nitrogen Atmosphere) Holding Time [min] | | | | |
|---|---|---|---|---|---|
| [μ mRa] | 15 | 30 | 60 | 90 | 120 |
| 0.11 | 2 | 1 | 0 | 0 | 0 |
| 1.04 | 0 | 0 | 0 | 0 | 0 |
| 4.95 | 0 | 0 | 0 | 0 | 0 |

In the degreasing step in the atmosphere with nitrogen flowing, the holding time in the degreasing step, which is required for adequately removing carbon residue, is believed to be longer as compared with the degreasing step in the atmosphere with air flowing, because there is no resin burning reaction developed with the use of oxygen in the air atmosphere.

As an experimental proof of the foregoing, it is understood from Table 2 that among the nine stacked bodies 10 of the all-solid batteries prepared with the use of the setter of 0.11 μmRa in surface roughness, one to two stacked bodies were found to have internal short circuit in the case of the holding time of from 15 to 30 minutes in the degreasing step. In addition, it is understood that internal short circuit was not found in any of the stacked bodies 10 of the all-solid batteries prepared with the use of the setter of 1.04 μmRa or more in surface roughness, regardless of the holding time. From the foregoing, it was confirmed that the use of the setter of 1.04 μmRa or more in surface roughness can remove carbon residue more effectively even in a nitrogen atmosphere, and suppress internal short circuit of the all-solid battery more effectively.

From the evaluation results mentioned above, it has been confirmed that when the stacked body is subjected to firing with the use of the setter of 0.11 μmRa or more and 50.13 μmRa or less, internal short circuit can be suppressed to prepare the stacked body for an all-solid battery without breaking the stacked body due to fixation to the setter. In addition, it has been confirmed that it is particularly preferable to have the stacked body fired with the use of the setter of 1.04 μmRa or more and 10.01 μmRa or less in surface roughness, because carbon residue can be efficiently removed even in a short period of degreasing time, and even in a nitrogen atmosphere to suppress internal short circuit, and because the surface of the stacked body has no asperity caused by the surface roughness of the setter.

The embodiments and examples disclosed herein are all to be considered by way of example in all respects, but not restrictive. The scope of the present invention is defined by the claims, but not the embodiments or examples described above, and intended to encompass all modifications and variations within the meaning and scope equivalent to the scope of the claims.

The method for manufacturing an all-solid battery according to the present invention can suppress internal short circuit of the all-solid battery by limiting the surface roughness of at least one surface of the stacked body in contact with the setter within a predetermined range of values, and the present invention is thus useful for the manufacture of all-solid batteries.

DESCRIPTION OF REFERENCE SYMBOLS

1: positive electrode layer,
2: solid electrolyte layer,
3: negative electrode layer,
4: current collector layer,
10: laminated body.

The invention claimed is:

1. A method for manufacturing an all-solid battery, the method comprising:
   preparing a first green sheet for at least any one of a positive electrode layer and a negative electrode layer;
   preparing a second green sheet for a solid electrolyte layer;
   forming a stacked body by stacking the first green sheet and the second green sheet; and
   firing the stacked body while sandwiched between two setters, each of which is placed in contact with respective opposing surfaces of the stacked body,
   wherein the two setters each have a surface roughness of 0.11 μmRa to 50.13 μmRa and a material of the two setters contains one or more ceramics selected from the group consisting of silicon carbide, silicon nitride, boron nitride, aluminum nitride, beryllium oxide, molybdenum disilicide, titanium nitride, and zirconium boride.

2. The method for manufacturing an all-solid battery according to claim 1, wherein the surface roughness of the setter is 1.04 μmRa to 10.01 μmRa.

3. The method for manufacturing an all-solid battery according to claim 1, further comprising applying a pressure to the stacked body through the two setters during the firing.

4. The method for manufacturing an all-solid battery according to claim 3, wherein the pressure is in the range of 500 kg/cm$^2$ to 5000 kg/cm$^2$.

5. The method for manufacturing an all-solid battery according to claim 1, wherein the firing includes:
   a first step of firing the stacked body at a first firing temperature; and
   a second step of firing the stacked body at a second firing temperature after the first step, the second firing temperature being higher than the first firing temperature.

6. The method for manufacturing an all-solid battery according to claim 5, further comprising applying a pressure to the stacked body through the two setters during the first step and the second step.

7. The method for manufacturing an all-solid battery according to claim 6, wherein the pressure is in the range of 500 kg/cm$^2$ to 5000 kg/cm$^2$.

8. The method for manufacturing an all-solid battery according to claim 1, wherein a material for at least one of the positive electrode layer, the solid electrolyte layer, and the negative electrode layer contains a solid electrolyte comprising a lithium-containing phosphate compound having a NASICON structure.

9. The method for manufacturing an all-solid battery according to claim 1, wherein a material for at least one of the positive electrode layer and the negative electrode layer contains an electrode active material comprising a lithium-containing phosphate compound.

10. The method for manufacturing an all-solid battery according to claim 1, wherein the two setters are each a porous body.

11. The method for manufacturing an all-solid battery according to claim 10, wherein the setter has 10 volume % to 50 volume % in porosity.

12. The method for manufacturing an all-solid battery according to claim 1, wherein the two setters each have a thermal conductivity of 5 W/m·K or more.

13. The method for manufacturing an all-solid battery according to claim 1, wherein the two setters each have a bending strength of 20 MPa or more.

14. The method for manufacturing an all-solid battery according to claim 1, wherein one of the two setters is placed in contact with a surface of the first green sheet.

15. The method for manufacturing an all-solid battery according to claim 1, wherein one of the two setters is placed in contact with a surface of the second green sheet.

* * * * *